United States Patent [19]

Waterman

[11] Patent Number: 4,724,923
[45] Date of Patent: Feb. 16, 1988

[54] VIBRATION ABSORBER WITH CONTROLLABLE RESONANCE FREQUENCY

[75] Inventor: Elisabeth H. Waterman, Alphen, Netherlands

[73] Assignee: Fokker B.V., Netherlands

[21] Appl. No.: 886,189

[22] Filed: Jul. 16, 1986

[51] Int. Cl.$^4$ .............................................. F16F 15/00
[52] U.S. Cl. .................... 181/208; 181/209; 188/267; 188/380; 267/136
[58] Field of Search .................. 181/207–209; 188/267, 378–380; 244/17.27; 248/554, 557, 559, 566, 620; 267/136, 137, 150

[56] References Cited

U.S. PATENT DOCUMENTS

| | | | |
|---|---|---|---|
| 3,091,307 | 5/1963 | Tiedemann et al. | 188/378 |
| 3,387,499 | 6/1968 | Broderlein | 188/267 X |
| 3,490,556 | 1/1970 | Bennett, Jr. et al. | 248/554 X |
| 3,836,098 | 9/1974 | Miyashita | 244/17.27 |
| 4,365,770 | 12/1982 | Mard et al. | 244/17.27 X |

Primary Examiner—Benjamin R. Fuller
Attorney, Agent, or Firm—Handal & Morofsky

[57] ABSTRACT

Apparatus for reducing mechanical vibrations in a first part of a structure, in which these vibrations occur through its connection to a part of the structure which is the source of the mechanical vibration. This apparatus comprises an electromagnet rigidly connected to the first part of the structure and a body of magnetizable material connected via a resilient element to the first part of the structure, while an air gap is provided between the electromagnet and the body. The electromagnet is energized by a variable current through at least one coil and it exerts an attractive force on said body which is oscillating due to the vibrations occurring in the first part of the structure. The restoring force exerted by the resilient element on the secondary body has the effect of lowering the resonant frequency of the second body on the resilient element as compared to the resonant frequency of the apparatus when no current passes through the coil. The amount of this lowering can be controlled depending upon the frequency of the exciting vibration by varying the electric current through the coil.

23 Claims, 5 Drawing Figures

VIBRATION ABSORBER WITH CONTROLLABLE RESONANCE FREQUENCY

The invention relates to an apparatus for reducing mechanical vibrations in a first part of a structure, in which these vibrations occur through its connection to a part of the structure which is the source of the mechanical vibrations. For the purpose of reducing the vibrations in the first part of the structure, this apparatus comprises two bodies of magnetizable material, the first body being rigidly connected to the first part of the structure and the second body being connected via a resilient element to the first part of the structure, while an air gap is provided between the two bodies. The first body is an electromagnet whose electromagnetic field strength is dependent on the current through at least one coil, this current being controlled by a control system in response to the frequency of the vibrations which are to be reduced.

In the prior art various solutions are known for reducing the transmission of mechanical vibrations from a second part of a structure to a first part, particularly in the case of structural parts of an aircraft.

In jet aircraft with fuselage mounted engines the engines are the sources of noise and vibration which are the prinicpal cause of cabin noise. In the engines the compressors and/or the turbines are always slightly out of balance, resulting in vibrations which are transmitted through the engine mountings to the fuselage structure. The air in the aircraft interior is thus caused to vibrate, giving rise to a noise problem for the crew and the passengers. If the engines are mounted at the rear of the fuselage, as is the case in the Fokker 100 and F28, the rear part of the cabin will experience the highest noise level.

One possible way of reducing the noise level is the provision of one or more dynamic vibration absorbers in or near the engine mountings. These can be disposed as close as possible to the engine mountings outside the aircraft cabin, but may also be placed inside the cabin, for example on the fuselage member between two engine mountings or on one of the engine mounting frames. The characteristic property of the vibration absorber is the neutralization of the kinetic energy of a vibration with a certain frequency or a relatively narrow range of frequencies which may occur at the fastening point.

Among other factors, the suitability of a specific design of an absorber of this kind is determined by the directions in which the mounted system is displaced as a result of excitation vibrations, and also by the magnitude and frequency of the acceleration experienced. For an absorber consisting of a mass-spring system contained within a casing, the direction of the displacement determines the nature and magnitude of the movement of the mass within the mass-spring system. The acceleration and the frequency determine the criteria for the strength and rigidity of the absorber, as well as the strength and rigidity of the casing in which the absorber is contained and by which it is mounted on the engine frame. A vibration absorber must have a resonance frequency equal to the exciting frequency. No other resonance frequencies may occur near the desired working range. The casing of the vibration absorber serves to transmit the excitation vibrations practically unchanged to the absorber. Examples of vibration absorbers of the mass-spring type are described in C-B-A No. 0,954,016 and U.S. Pat. No. 3,490,556. Both patents describe a mass-spring system which is adjusted to a narrow range of frequencies.

The first mentioned patent is applied to the interior of propeller-driven aircraft. Mass-spring elements are described which are each adjusted to one excitation frequency and are mounted on that part of the structure of the aircraft which is subject to the frequency which one desires to reduce. A dynamic vibration absorber of this kind is found surprisingly effective if its total weight and the cost of the mounted dampers are compared with the weight and cost of various other means for lowering the noise level in the cabin.

A large number of these types of vibration absorbers, tuned to the same resonance frequency, may be required when the structural part which has to be damped has its first resonance frequencies substantially below the exciting frequency.

In the SAE report No. 830736 (Technical paper "Cabin Noise Control for Propeller Aircraft") further details are given in this connection.

U.S. Pat. No. 3,490,556 describes a mechanical mass-spring system consisting of a mass on a disc-shaped spring, with which a determined excitation frequency can be adequately damped whatever the direction of the vibrations. Despite the good properties of this system, however, it has the same shortcoming as the previously described damper, namely the fact that if flight conditions have the consequence that the excitation frequency changes so much that the damper can no longer react to it, the noise in the cabin cannot be effectively controlled by the damper. The damper may even itself be a source of noise, which is counterproductive.

In the case of the reduction of vibrations in a structure for the purpose of reducing noise in the cabin of an aircraft, the type of vibration absorber depends on whether the excitation frequency remains practically constant or whether the frequency varies.

The operating range of engine speed during cruise flight of an aircraft will be dependent on the manner in which the pilot or automatic pilot conducts the flight. For the Fokker 100, for example, the speed of the low-pressure compressor during normal cruise flight may vary between 81% and 94%. In view of the fact that a speed of 100% produces a vibration of about 140 Hz, a variation from 81% to 94% gives a frequency drift of about 113 Hz to 132 Hz. In the situation of this example an optimal vibration absorber must have a resonance frequency of 132 Hz, while it must be possible to lower this automatically up to about 113 Hz.

As a consequence of this large variation of engine speed, the frequency of the vibration giving rise to the noise problem will vary because at every speed level the engine shafts will have a different frequency of unbalance. Satisfactory noise reduction consequently cannot be expected from a conventional dynamic vibration absorber having a fixed resonance frequency.

Other mass-spring systems exist which have similarities to vibration absorber systems, but which serve the purpose of damping or providing insulation against mechanical vibrations. A vibration absorber seeks to modify the load spectrum of the surrounding structure on which the system is fastened. The system converts the excitation spectrum into a different spectrum acceptable to the structure. As an example of vibration absorbers mention may be made of U.S. Pat. Nos. 4,365,770 and 3,836,098. The latter relates to a helicopter having a fixed wing under the rotor. The rotor, which consists of a plurality of blades, produces a current of air varyingly loading the fixed wing, so that frequencies may occur which coincide with the natural frequenies of the fixed wing. The natural frequencies can be modified by varying the construction or by adding balance weights to it. In the present case preference is given to a system in which the undesired excitation frequency of the helicopter rotor is selected by sensors from the frequencies occurring and is transmitted to an electric computer unit, which with the aid of electromagnetic means controls the position of a hydraulic valve and thus determines the natural frequency of the mass-spring system.

Through the action of the computer unit, the length of the spring of the mass-spring system is in fact lengthened or shortened until the natural frequency of the system coincides with the excitation frequency.

Another example of a vibration insulator is U.S. Pat. No. 4,531,699. This system relates to a method of ensuring that in an aircraft low-frequency vibration, resulting for example from air pockets, the rotor of a helicopter, and other internal and external sources, will not be transmitted to the cabin floor of the aircraft. This is particularly important when the load being transported and resting on the floor cannot tolerate vibration. The system is situated between the cabin floor, which is loaded by a variable mass, and the underlying aircraft structure in which vibrations undesirable for the mass in question may occur. The system reacts to the frequency and amplitude of undesirable vibrations by generating reciprocal vibrations, thereby increasing or reducing the rigidity of the system in such a manner that the mass is insulated against exciting vibrations.

Although the publications mentioned describe some solutions for damping mechanical vibrations, these solutions are not satisfactory in the situation to which the invention relates. This situation, which has been briefly described above, requires the system to be operational in a determined frequency range of mechanical vibrations which may occur in a structure and which may radiate noise which is annoying for passengers and crew. The vibration reducing system must be a mass-spring system which is surrounded by a casing and can easily be fastened on the structure in question. The automatic adjustment of the mass-spring system to the vibration frequency which is to be reduced must not be based on any modification of the active mass or on mechanical variation of the stiffness of the spring.

According to the invention an apparatus of the kind first defined above is now provided, which is characterized in that the first body consists of an even number of yoke parts, which first body is provided with at least one electric coil through which under the control of the control system a current varied in accordance with vibration frequency can be passed. These yoke parts together with the second body of magnetizable material in between, define at least one electromagnetic flux circuit. These are arranged in such a manner that when electric current flows through the respective coils a magnetic force is applied to the second body. When it is displaced from its equilibrium state, by vibration, the distance the secondary body travels is increased, resulting in a decrease of the resonance frequency of the apparatus. The second body in this arrangement may consist of permanently magnetized material.

In situations in which a certain range of frequencies have to be reduced, the system according to the invention provides broadening of the field of operation through automated variation of the net spring stiffness of the system by the generation—by making use of the movement of the sprung mass—of an additional negative stiffness through the adjustable field of the electromagnets. The location of the elecromagnets with resepct to the sprung mass is such that the mass will move in the same plane as that in which the vibrations which are to be damped occur, the mass being enclosed at two sides or completely surrounded by electromagnetic poles depending on the number of directions of the vibrations concerned. For automatic adjustment, use is made of the phenomenon in which the electrical energization of the magnets with the variation in time of the narrow air gap between the mechanically sprung mass and the poles of an electromagnet, induction occurs in the coils of the magnet in dependence on the movement of the sprung mass. For situations in which the vibration frequency which is to be damped is lower than the resonance frequency of the vibration absorber, a control circuit continuously measures the highest amplitude occurring in the induced voltage in the coils of the magnets, and at that frequency adjusts for the magnets connected in series a current such that the amplitude of the induced voltage becomes as high as possible. The effect is thus achieved that the resonance frequency of the vibration absorber is adjusted to the frequency to be damped which prevails at that moment. The control system is fed by an external voltage source. The dimensions of the various components of the preferred form of the apparatus are so selected that with minimum current through the coils, vibrations are produced at the highest possible frequency required to be damped, while with maximum current is produced at the lowest frequency required to be damped. In the embodiment in which the sprung mass is a (permanent magnet) the damping characteristic will be different. The control system thus ensures that the mass-spring system will react in automated fashion to the frequency which is to be damped.

Further details and preferred embodiments of the invention will be described below more fully with reference to the accompanying drawings.

Figure 1:
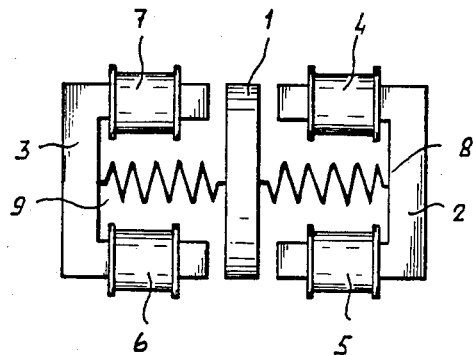
FIG. 1 illustrates schematically the basic operation of a system according to the invention.

FIG. 1 shows a basic diagram of the system according to the invention. The body 1 is suspended via the openings 8 and 9 between the yokes 2 and 3. The coils 4 and 5 are mounted on the yoke 2, and the coils 6 and 7 on the yoke 3. In the position of rest the springs 8 and 9 ensure that the four air gaps between the body 1 and the ends of the yokes 2 and 3 will all be equal in size. The yokes 2 and 3 are rigidly fastened to the part of the structure (not shown) in which vibrations can occur. The body 1 is fastened via the springs 8 and 9 to the part of the structure.

Figure 2:
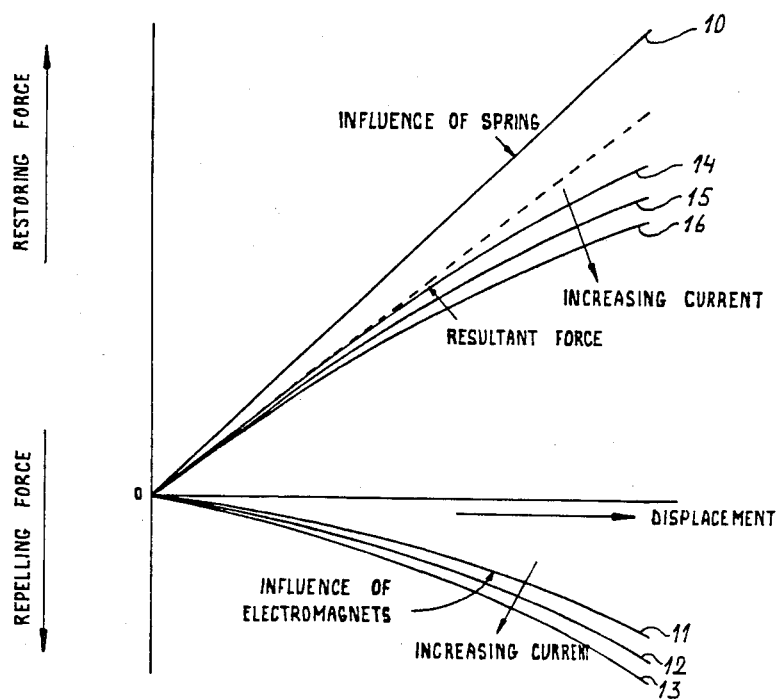
FIG. 2 shows the relationship between the force and the deflection in a system according to the invention for various values of the current through the coils of the electromagnets.

FIG. 2 is a diagram showing the relationship between the restoring force and the repelling force applied to the body 1 and the displacement of the body 1. The restoring force is plotted along the positive vertical axis, the repelling force along the negative vertical axis, and the displacement is plotted along the horizontal axis.

If it is assumed that at the beginning no current is passing through the coils 4, 5, 6, and 7, the behaviour of the body 1 will be determined solely by the springs 8 and 9. As right-hand line 10 in FIG. 2 shows, the springs 8 and 9 will apply to the body 1 a restoring force which greater, as the displacement of the body 1 in relation to its neutral position becomes greater.

Together with the body 1 the yoke 2 forms a first flux circuit, and the yoke 3 forms together with the body 1 a second flux circuit. If a current is passed through the coils 4, 5, 6 and 7 and if it is assumed that the two flux circuits are of identical construction, this current will not in itself have any influence on the position of the body 1. If however the body 1 is brought out of the neutral position through the action of mechanical vibrations, and is for example displaced in the direction of the yoke 2, the air gaps between the body 1 and the yoke 2 will become smaller, and the air gaps between the body 1 and the yoke 3 will become larger. The result is that the attractive force of the yoke 2 on the body 1 will increase, and the attractive force of the yoke 3 on the body 1 will decrease, thus giving rise to a resultant repelling force of the body 1 from the neutral position in the direction of the yoke 2. This repelling force becomes (non-linearly) greater with increasing displacement, as indicated in FIG. 2 in that part of the diagram , as indicated below the horizontal axis. The curves 11, 12 and 13 apply to respective higher values of the current through the coils 4, 5, 6 and 7.

If the influence of the spring is combined with the influence of the electromagnetic circuits, the curves 14, 15 and 16 will be obtained, which relate to respective higher values of the current through the coils 4, 5, 6 and 7. These curves show that in principle it is possible to lower the spring stiffness of the entire system with the aid of the electromagnetic circuits. Maximum spring stiffness occurs when the current is zero, in other words when no current passes through the coils, and minimum spring stiffness occurs with the maximum permissible current through the coils. The invention now makes use of this phenomenon to provide a damping apparatus in which the spring stiffness varies in dependence on the frequency of the vibrations which occur.

The embodiment illustrated schematically in FIG. 1 can easily be translated into a practical construction by the specialist. A further developed construction, which is preferred within the scope of the invention, is shown in FIGS. 3 and 4.

Figure 3:
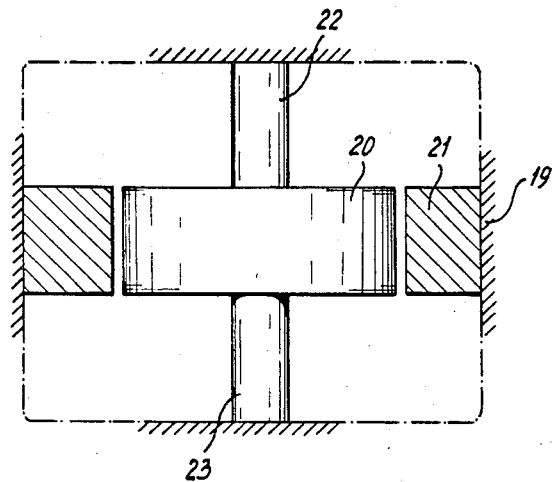
FIG. 3 is a schematic section through one form of construction of a damper according to the invention.
Figure 4:
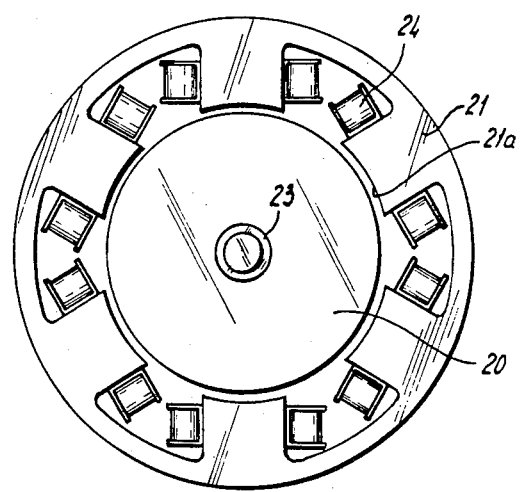
FIG. 4 is a top plan view of the damper shown in FIG. 3.

In FIGS. 3 and 4 a first pair of the structure in which vibrations occur is given the general designation 19. The first of the two bodies of magnetizable material is rigidly joined to the structural part 19 and is designated 21, and the second body of magnetizable material is designated 20. As can be seen in FIGS. 3 and 4, the first body 21 is in the form of an annular yoke having an even number (six in this example) of yoke legs 21a which extend radially inwards and which end a short distance from the cylindrical second body 20. Between each of the yoke legs 21a and the second body 20 an air gap of equal size exists in the position of rest. A coil 24 is wound on each of the yoke legs 21a. These coils are shown only in FIG. 4, and for the sake of clarity are omitted in FIG. 3. The second body 20 is fastened by means of two rod-shaped members 22 and 23 to the first structural part 19. The rod-shaped members 22 and 23 are preferably of equal dimensions and act on the centre of the respective surface of the second body 20. These rod-shaped members 22 and 23 serve as spring members and permit slight displacement of the second body 20 within the space defined by the end faces of the yoke legs 21a.

The direction of winding of the six coils 24 is such that respective diametrical oppositely disposed yoke legs 21a form in each case associated north and south poles. In addition, all the coils are connected in series, so that the influence of the induced voltages is uniformly distributed. Both the second body 20 and the first body 21 are preferably made of laminated metal, for example soft iron, in order to prevent as far as possible any damping resulting from eddy currents in the body itself.

An electronic control system incorporated in the feed circuit of the magnet coils provides a restoring force which produces a linear curve when plotted aginst amplitude.

The construction of the mass-spring system is determined depending on the nature of the highest frequency which has to be damped, by first determining the resonance frequency of the mass-spring system taken out of its casing and rigidly clamped on a fixed foundation. The frequency lowering action of the casing (which is not separately shown in FIGS. 3 and 4), and the fastening of the casing to the first part of the structure is then allowed for. If it is then further ascertained how low the lowest frequency to be damped must be and thus the maximum current required for the electromagnets and the dimensions of the windings will be obtained. The correct functioning of the vibration absorber is to a great extent dependent on the size of the air gap between the second body 20 and the yoke legs 21a. In order to obtain a high magnetic force this air gap must be small, and the permissible value of the air gap is also related to the maximum relative displacement amplitude of the second body 20 occurring within its operating range.

A guideline for the maximum size of the air gap is for example 0.5 mm. Tests have shown that the required resultant electromagnetic force can be obtained with this size. A smaller maximum air gap is certainly permissible, but the cost of manufacture of the vibration absorber as a whole will increase considerably as the result of the far more stringent tolerance requirements. Furthermore, tolerances are in any case of importance in the manufacture of this vibration absorber. It has been found that an increase of the air gap by 0.005 resulted in a variation of the working range of 132–113 Hz to 132–118 Hz. If on the other hand the air gap is reduced in size, the constraints on the movement of the mass will be too large.

Figure 5:
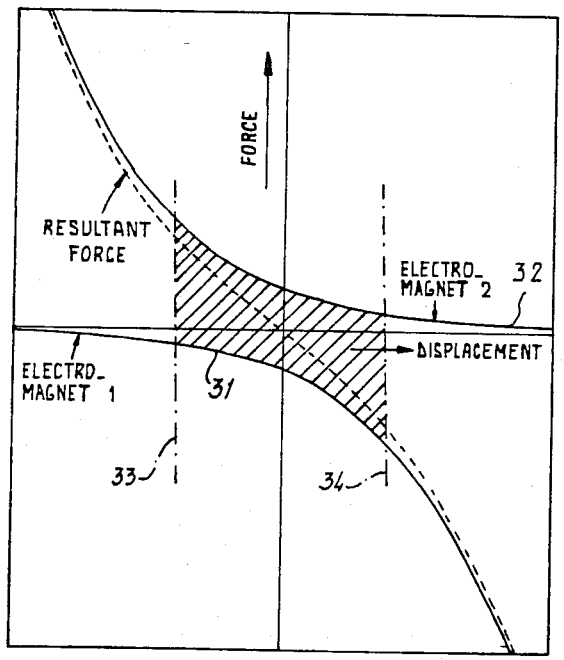
FIG. 5 shows the range of possible combinations of resultant force and displacement.

Finally, FIG. 5 shows the relationship between the force produced by a pair of magnets disposed diametically opposite one another and the displacement of the sprung mass 20. The relationship between the displacement of the mass 20 and the force produced by the first electromagnet at maximum current through the coil of this magnet is indicated with the aid of the solid line 31. The line 32 applies to the other magnet. The two lines 31 and 32 define between them the operating range of the system. If the size of the air gap between the first body 21 and the second body 20 is determined, this will also provide a limit for the maximum displacement of the sprung mass 20. These limits are shown by the dot-and-dash lines 33 and 34 in FIG. 5. The resulting operating range of the dicated by the hatched area within the lines 31, 32, 33 and 34 in FIG. 5. This figure shows that the resultant force of the two magnets within this range has an approximately linear course. By means of an electronic control system the relationship between force and displacement can be made entirely linear; despite the presence of magnetic forces a linearly acting mass-spring system is thus obtained, with the result that a determined resonance frequency of the damper is kept constant. An electronic control system of this kind functions in particular, close to the ends of the working range, especially if a judicious choice of the air gaps enables the lines 33 and 34 to be drawn relatively far from the zero point of the axis system.

I claim:

1. Apparatus for reducing mechanical vibrations in a first part of a structure in which said vibrations occur through connection of said first part to a part of the structure which is a source of the mechanical vibration, comprising first and second bodies of magnetizable material, said first body being rigidly connected to said first part of said structure and said second body being connected via a resilient element to said first part of said structure, said second body and said resilient element having a resonant frequency, said first and second bodies being positioned with an air gap between them, said first body being an electromagnet having an electromagnetic field strength dependent on current passing through at least one coil associated with said electromagnet, said current being controlled by a control system in accordance with the frequency of the vibrations which are to be reduced, said electromagnet exerting an attractive force on said second body which is oscillating due to the vibrations occurring in said first part of the structure in such a way that a restoring force exerted by said resilient element on the second body, caused by the deformation of the resilient element by the movement of the second body, is partly counteracted, resulting in a reduction of the net restoring force which has the effect of lowering the resonance frequency of the second body on the resilient element as compared to the resonant frequency when no current passes through the coils, the amount of said lowering being controlled in response to the frequency of the exciting vibration by varying the attractive force between the first body and the second body by varying the electric current through the coils.

2. Apparatus according to claim 1, wherein the first body of magnetizable material consists of an even number of yoke parts and is provided with at least one electric coil through which under the control of the apparatus3 control system, a current dependent on vibration frequency can be passed, these yoke parts together with the secondary body defining at least one electromagnetic flux circuit.

3. Apparatus according to claim 2, wherein the second body is in the form of a relatively flat body having parallel top and bottom surfaces and one or more side surfaces, and wherein the yoke parts of the first body, directed towards the axial center line of the second body, are so positioned relative to the side surfaces that the air gaps between the second body and the yoke parts defining said electromagnet flux circuit, and are situated diametrically opposite one another.

4. Apparatus according to claim 3, wherein said side surfaces are formed by a circularly cylindrical peripheral wall of the relatively flat second body.

5. Apparatus according to claim 3, wherein the yoke parts are combined to form an integral yoke part provided with a number of yoke legs which are disposed in pairs and diametrically opposite one another, and each of which forms an air gap with the second body.

6. Apparatus according to claim 5, wherein the yoke parts are provided with a circularly cylindrical base concentric to the circularly cylindrical peripheral wall of the second body and positioned around said second body, the yoke legs extending radially from said base.

7. Apparatus according to claim 2, wherein the second body is provided with parallel top and bottom surfaces and wherein the yoke parts of the first body have lips defining a U-shape and are disposed in pairs in mirror image symmetry opposite the bottom and top surfaces respectively of the second body, each of the legs of the U-shaped yoke parts together with the second body defining an air gap.

8. Apparatus according to claim 1, wherein the resilient element consists of two identical rod-shaped members lying line with one another and whose center line is at right angles to the direction in which the second body can be displaced relative to the first body, each said member being coupled to the center of the top and bottom surfaces respectively of the second body.

9. Apparatus according to claim 1, wherein in a position of rest the geometrical center of the first and second bodies coincide.

10. Apparatus according to claim 1, wherein the control system is provided with a frequency transducer which transmits to the system a signal proportional to the frequency of the vibrations which occur, and that the system supplies current to each coil, the intensity of which current is proportional to the frequency, while the dimensions of the various components of the apparatus are so selected that at minimum current through the coils, vibrations are damped whose frequency is the highest frequency required to be damped, and the coils and magnetic circuits defined by said coils are so dimensioned that at maximum current the lowest frequencies required to be damped are damped.

11. Apparatus according to claim 1 in which the secondary body is a permanent magnet.

12. Apparatus for reducing mechanical vibrations in a first part of a structure in which said vibrations occur through connection of said first part to a part of the structure which is a source of the mechanical vibration comprising first and second bodies of magnetizable material, said first body being rapidly connected to said first part of said structure and said second body being connected via a resilient element to said first part of said structure, said second body and said resilient element having a resonant frequency, second body being positioned with an air gap between, said first body being an electromagnet having an electromagnetic field strength dependent on current passing through at least one coil associated with said elecromagnetic, said current being controlled by a control system in accordance with the frequency of the vibrations which are to be reduced, said electromagnet exerting a force on said second body which is oscillating due to the vibrations occurring in said first part of the structure in such a way that a restoring force exerted by said resilient element on the second body, caused by the deformation of the resilient element by the movement of the second body, is changed, resulting in a change of the net restoring force which has the effect of altering the resonant frequency of the second body on the resilient element as compared to the resonant frequency when no current passes through the coils, the amount of the altering being controlled in response to the frequency of the exciting vibration by varying the force between the first body and the second body by varying the electric current through the coils.

13. Apparatus to attenuate the noise in the cabin of an aircraft originating from at least one engine of that aircraft, said apparatus being on a part of the cabin structure to which vibrations are transmitted from said engine for the purpose of reducing the vibrations of said part of the structure to attenuate the noise level in the cabin of the aircraft, said apparatus comprising a metal mass carried by at least one resilient element, the mass being enclosed by a metal housing, said resilient element being rigidly connected to said mass and to said housing, there being enough space between said mass and said housing for allowing displacements of the mass when oscillating due to vibrations occurring in said part of the structure to which the apparatus is mounted, said housing containing an even number of electromagnets, positioned diametrically around said mass, each connected to means for passing a variable energizing current through at least one corresponding coil of the electromagnets to exert a magnetic force on the mass in such a way that the restoring force exerted by said resilient element on the mass caused by the deformation of the resilient element by the movement of the mass is partly counteracted, resulting in a reduction of the total restoring force so as to lower the resonance frequency of the mass on the resilient element with respect to the condition in which no current passes through the coils, whereby the amount of this frequency lowering can be controlled by a control system in dependence of the frequency of the exciting vibration by varying the attractive force between the housing and the mass by control of said current passing means to vary the electric current through the coils.

14. Apparatus according to claim 13, wherein the housing consists of an even number of yoke parts each associated with at least one electric coil through which a current dependent on vibration frequency can be passed, these yoke parts together with the metal mass defining at least one electromagnetic flux circuit.

15. Apparatus according to claim 14, wherein the metal mass is in the form of a relatively flat body having parallel top and bottom surfaces and one or more side surfaces, and the yoke parts of the housing, directed towards the axial centre line of the metal mass, are so positioned relative to the side surface that the space between the metal mass and the yoke parts defining said electromagnet flux circuit, are situated diametrically opposite one another.

16. Apparatus according to claim 15, wherein said side surfaces are formed by a circularly cylindrical peripheral wall of the relatively flat metal mass.

17. Apparatus according to claim 15, wherein the yoke parts are combined to form an integral yoke part provided with a number of yoke legs which are disposed in pairs and diametrically opposite one another, and each of which forms an air gap with the metal mass.

18. Apparatus according to claim 17, wherein the yoke parts are further defined by a circularly cylindrical base concentric to the circularly cylindrical peripheral wall of the metal mass and positioned around said metal mass, the yoke legs extending radially from said base.

19. Apparatus according to claim 14, wherein the metal mass is provided with parallel top and bottom surfaces, and the yoke parts of the housing having legs defining a U-shape and are disposed in pairs in mirror image symmetry opposite the bottom and top surfaces respectively of the metal mass, each of the legs of the U-shaped yoke parts defining together with the metal mass an air gap.

20. Apparatus according to claim 15, wherein said resilient element consists of two identical rod-shaped members lying in line with one another and whose centre line is at right angles to the direction in which the metal mass can be displaced relative to the housing, each said member being coupled to the centre of the top and bottom surfaces respectively of the metal mass.

21. Apparatus according to claim 13, wherein in a position of rest the geometrical centres of the housing and the metal mass coincide.

22. Apparatus according to claim 13, wherein the control system is provided with a frequency transducer which transmits to the system a signal proportional to the frequency of the vibrations which occur, and the control system varies the current passed through each coil so that the intensity of the current is proportional to the frequency, while the dimensions of the various components of the apparatus are so selected that, at minimum current through the coils, vibrations are damped whose frequency is the highest frequency required to be damped, and the coils and magnetic circuits defined by said coils are so dimensioned that, at maximum current, the lowest frequencies required to be damped are damped.

23. Apparatus according to claim 13 which the metal mass is a permanent magnet.

* * * * *